United States Patent [19]

Hohn et al.

[11] Patent Number: 4,896,274

[45] Date of Patent: Jan. 23, 1990

[54] VELOCITY PROPORTIONAL DAC FOR USE WITH A PROGRAM CONTROLLED MANIPULATOR

[75] Inventors: Richard E. Hohn; Gregory Webb; John C. Lauchnor, all of Cincinnati, Ohio; Charles C. Teach, Bloomfield Hills, Mich.

[73] Assignee: Cincinnati Milacron Inc., Cincinnati, Ohio

[21] Appl. No.: 818,650

[22] Filed: Jan. 14, 1986

[51] Int. Cl.[4] .................. B05D 1/02; G06F 15/42
[52] U.S. Cl. .......................... 364/513; 118/674
[58] Field of Search ............ 364/513; 901/43, 41; 156/350, 356, 361; 118/674, 697

[56] References Cited

U.S. PATENT DOCUMENTS

| | | | |
|---|---|---|---|
| 3,412,431 | 11/1968 | Lemelson | 18/26 |
| 3,785,898 | 1/1974 | Gerber et al. | 364/513 |
| 3,909,831 | 9/1975 | Marchio et al. | 346/140 R |
| 3,931,787 | 1/1976 | Kuttner et al. | 118/674 |
| 4,166,246 | 8/1979 | Matt | 377/19 |
| 4,431,690 | 2/1984 | Matt et al. | 118/674 |
| 4,506,335 | 3/1985 | Magnuson | 364/513 |
| 4,530,862 | 7/1985 | Kerzel | 118/674 |
| 4,564,410 | 1/1986 | Clitheros et al. | 156/356 |
| 4,584,964 | 4/1986 | Engel | 901/43 |
| 4,605,569 | 8/1986 | Shimada et al. | 901/41 |

FOREIGN PATENT DOCUMENTS 2142257A 7/1983 United Kingdom .

OTHER PUBLICATIONS

"Requirements of Sealant Application Robots", by Huang, B. and Ruddle, J., *Robots Eight Conference Proceedings,* Jun. 1984.

"Speed is Key to Sealant Dispensing", *Robots in Industry,* Jun. 1985.

*Primary Examiner*—Allen MacDonald
*Attorney, Agent, or Firm*—John W. Gregg

[57] ABSTRACT

A machine and control are provided for effecting motion of a function element, such as an adhesive material dispensing gun, and controlling the operation of the function element by means of a control signal proportional to the velocity of a workpoint associated with the function element. The control produces a velocity signal representing the velocity of the workpoint, calculates the value of a control signal using the velocity signal and predetermined constant defining the constant of proportionality and zero velocity output and applies the control signal to a digital-to-analogue converter to produce an output signal for controlling the function element.

10 Claims, 4 Drawing Sheets

VELOCITY PROPORTIONAL DAC FOR USE WITH A PROGRAM CONTROLLED MANIPULATOR

SUMMARY OF THE INVENTION

The present invention is directed to an improvement to the program controlled manipulator described in U.S. Pat. No. 4,506,335 entitled "Manipulator With Controlled Path Motion" issued Mar. 19, 1985 in the name of T. J. Magnuson, the disclosure of which is incorporated herein by reference. Although the present invention has been described and illustrated in connection with the type of manipulator and control described in U.S. Pat. No. 4,506,335, it will be understood from the detailed description which follows that it also has application to other types of controlled motion manipulator control systems.

Generally, in the type of manipulator controls shown in U.S. Pat. No. 4,506,335, there is an input/output function interface which exchanges signals with application dedicated devices associated with the manipulator for example, a grinding wheel or the like. Often, this function interface includes a digital-to-analogue converter (DAC) which produces an output voltage under direction of the manipulator control processing. In many instances, the output voltage from the DAC is used as a two-level binary control voltage for various types of application dedicated devices.

For example, in one type of typical manipulator application, the DAC output voltage may be used to control an adhesive application gun in order to apply a continuous bead of sealant or adhesive along a predetermined path on an automobile body panel. In another application, the DAC output voltage may be used to control the feed of welding rod in association with an arc welder carried by the manipulator arm.

However, in the typical applications just described, as well as in other similar types of applications, generally only a single DAC is used whose output voltage is selectably "on" or "off", effectively switching between 0 volts and a programmed value. Thus, in a typical application where the DAC voltage might be used to control the operation of an adhesive application gun attached to the manipulator arm, the gun can only be programmed through the manipulator control processing and DAC output to apply adhesive at a constant rate if the DAC output is "on" or cease applying adhesive if the DAC output is "off".

In many instances, this type of operation is completely satisfactory. However, in some applications there is a need to vary the rate of material application as a function of the relative velocity of the applicator to the workpiece surface or for other reasons. For example, in the application where the manipulator arm is used to guide an adhesive gun applying a continuous bead of adhesive along a predetermined path to an automobile body panel, it is desirable to maintain a constant width bead of adhesive regardless of the velocity of the arm as it stops and starts or changes direction and speed. For example, if the manipulator arm increases its velocity along its path of travel, the flow of adhesive from the adhesive gun must be temporarily increased in order to maintain a constant volume per unit length along the path, and hence bead width. Similarly, if the adhesive bead path suddenly changes direction, the flow rate of adhesive must be decreased in order to prevent a glob of adhesive from being deposited at the point of direction change.

Thus, in the type of application described, by varying the rate of flow of the adhesive in direct proportion to the velocity of the manipulator arm, a constant width bead may be applied. It will also be understood that a similar type of velocity dependent relationship may be utilized to control other types of dispensing means carried by the manipulator arm such as paint sprayers, welding wire dispensers for arc welding, etc.

In a preferred embodiment of the present invention, a number of independent DAC channels are provided, each DAC channel being separately programmable with a particular analogue output voltage which can be made to vary with the velocity of the workpoint effected by the manipulator arm according to the general relationship:

$$V_o = K_o(K_1 + K_2 v)$$

where:
- $V_o$ = velocity proportional DAC output voltage
- $K_o$ = scale factor constant
- $K_1$ = constant defining the output voltage at zero velocity
- $K_2$ = proportionality factor constant defining the rate of change of output voltage with velocity
- $v$ = instantaneous path velocity of the workpoint As can be seen from this equation, the scale and proportionality constants can be established so that various ones of the DAC output voltages either increase or decrease proportionally with velocity. Thus, the output voltage of each DAC will be selectively proportional to the instantaneous path velocity of the workpoint. In addition, the constant $K_1$ of the various DACs may be chosen to provide a desired constant DAC output voltage when the manipulator arm is stationary, i.e. $v=0$. Further, if $K_1 = 0$, there will be no DAC output voltage when the manipulator arm is at rest. Finally, as will be described in detail hereinafter, limits may be placed on the DAC output voltage to prevent it from exceeding a predetermined value.

In the particular application where the DAC output voltage is used to control the flow of adhesive or sealant from an adhesive application gun, the scale factor and proportionality constants in the DAC output voltage/velocity equation can be chosen so that adhesive flow increases or decreases with velocity, or so that flow at a constant rate or no flow at all occurs when the manipulator arm is at rest. In addition, the velocity proportional feature of the DAC can be superimposed on conventional DAC operation so that in one mode of operation the DAC produces a two-level binary output voltage, and in a second mode of operation produces a velocity proportional output voltage.

Further features of the invention will become apparent from the detailed description which follows.

DESCRIPTION OF THE PREFERRED EMBODIMENT

For purposes of illustrating the invention, a manipulator and control combination constituting a preferred embodiment will be described. The manipulator and control correspond to those manufactured by Cincinnati Milacron Inc., the assignee of the present invention. It is to be understood that the particular structure of the manipulator of the preferred embodiment is not to be construed as a limitation on the present invention. Rather, any machine operating under computer control and having at least one DAC may be used, particularly those incorporating serially linked axes of rotary motion controlled by interpolation of intermediate points along the predetermined path defined with reference to a rectangular coordinate system or another suitable coordinate system independent of the machine coordinate system, such as that described in U.S. Pat. No. 4,506,335.

Figure 1:
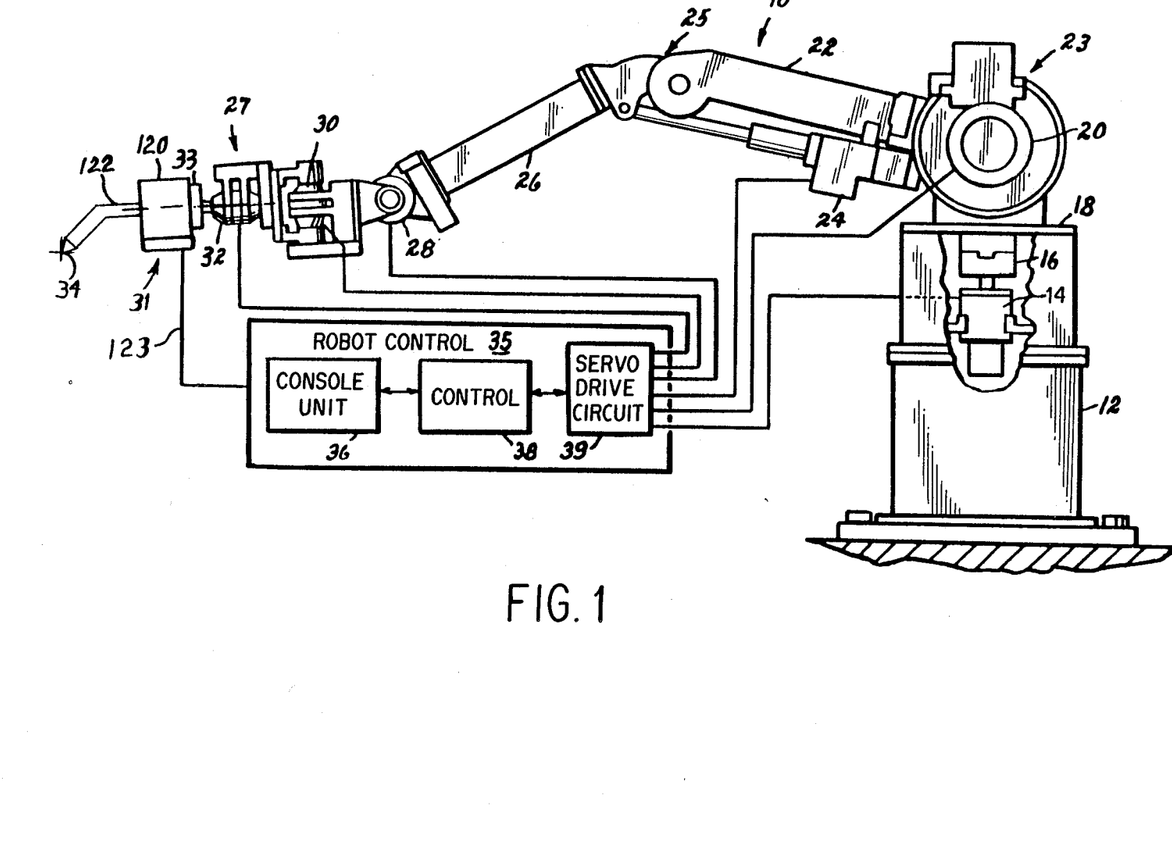
FIG. 1 shows a typical articulated manipulator and the schematic connection thereof with the control.

Referring to FIG. 1, the articulated manipulator 10 is shown connected to control 35 and carrying an adhesive application gun 120 having an adhesive application nozzle 122 configured to lay down a bead or stream of adhesive from a suitable source of adhesive supply (not shown). The rate of flow of adhesive from nozzle 122 is controlled by means of a control signal on line 123 such that the rate of flow of adhesive will be proportional to the magnitude of the electrical control signal on line 123.

Although for purposes of an exemplary showing, the present invention is described and illustrated as controlling the flow of adhesive from an adhesive applicator gun, it will be understood that the inventive principles may be extended to other types of control mechanisms such as paint sprayers, welding rod feeders, etc. Thus, the present invention also finds application for controlling the amount of paint sprayed by a paint sprayer in a paint spraying application, or the rate of feed of welding rod in an arc welding application, through control of the analogue control signal on line 123. Thus, any type of mechanism responsive to the magnitude of an analogue control signal may be attached to the end of the manipulator arm of manipulator 10 and controlled by control 35 through control signal 123.

The manipulator 10 includes base 12 upon which is rotatably mounted the shoulder plate 18 and within which are the shoulder rotation actuator 14 and the intermediate coupling 16. Actuator 14, coupling 16 and mounting plate 18 cooperate to effect rotation of the manipulator structure about a vertical axis passing through the center of plate 18. Upper arm 22 is rotatably supported upon plate 18 at the shoulder joint 23 and rotated about a horizontal axis intersecting the vertical axis through the center of the shoulder joint 23. Rotation of the upper arm 22 about the shoulder axis is effected by actuator 20. A forearm 26 is connected to upper arm 22 at an elbow joint 25 and is rotated thereabout by means of actuator 24 which may be a linear actuator such as a piston and cylinder or screw and nut. The actuators 14, 20 and 24 are sufficient to effect motion of the forearm 26 to place the end thereof in any position within the volume described by the mechanical limitations of the structure.

To maximize the flexibility of motion achieved by control of the manipulator, three additional axes of motion follow forearm 26. These three additional axes are intended to effect control over the orientation of the tool carried by the manipulator with respect to a relocatable point of reference. The first of these orientation axes corresponds to a rotation about a horizontal axis at the end of the forearm 26 driven by actuator 28 to effect changes in pitch of the gun 120 carried by the manipulator. The second orientation axis is vertical and perpendicular to the first and effects changes of yaw of the tool carried by the manipulator and is driven by actuator 30. The third orientation axis for controlling roll is perpendicular to the second axis and is driven by actuator 32. These three orientation axes constitute the wrist 27 of the manipulator 10. Alternatively, orientation of the adhesive application gun 120 may be effected by means of other wrist structures, such as, for example, a three roll wrist as described and claimed in U.S. Pat. 4,068,536.

At the end of wrist 27, is the face plate 33 to which is mounted the gun 120. The gun 120 constitutes a function element 31 carried by manipulator 10. The stored program for controlling the motion of function element 31 specifies positions of a workpoint or tool centerpoint 34 and orientations of the function element 31 with respect to the relocatable centerpoint 34, as well as the velocity of the workpoint between successive locations and functions associated with the work processing to be executed at the programmed locations.

Control 35 includes a console unit 36 to permit communication between an operator and the manipulator 10, a control 38 for processing a stored program directing the movements of manipulator 10, and a servodrive circuit 39 responsive to control 38 for controlling the machine actuators 14, 20, 24, 28, 30 and 32. Since the particular type of actuators and drive circuits do not form a part of the present invention, further details of these devices are not provided.

Figure 2:
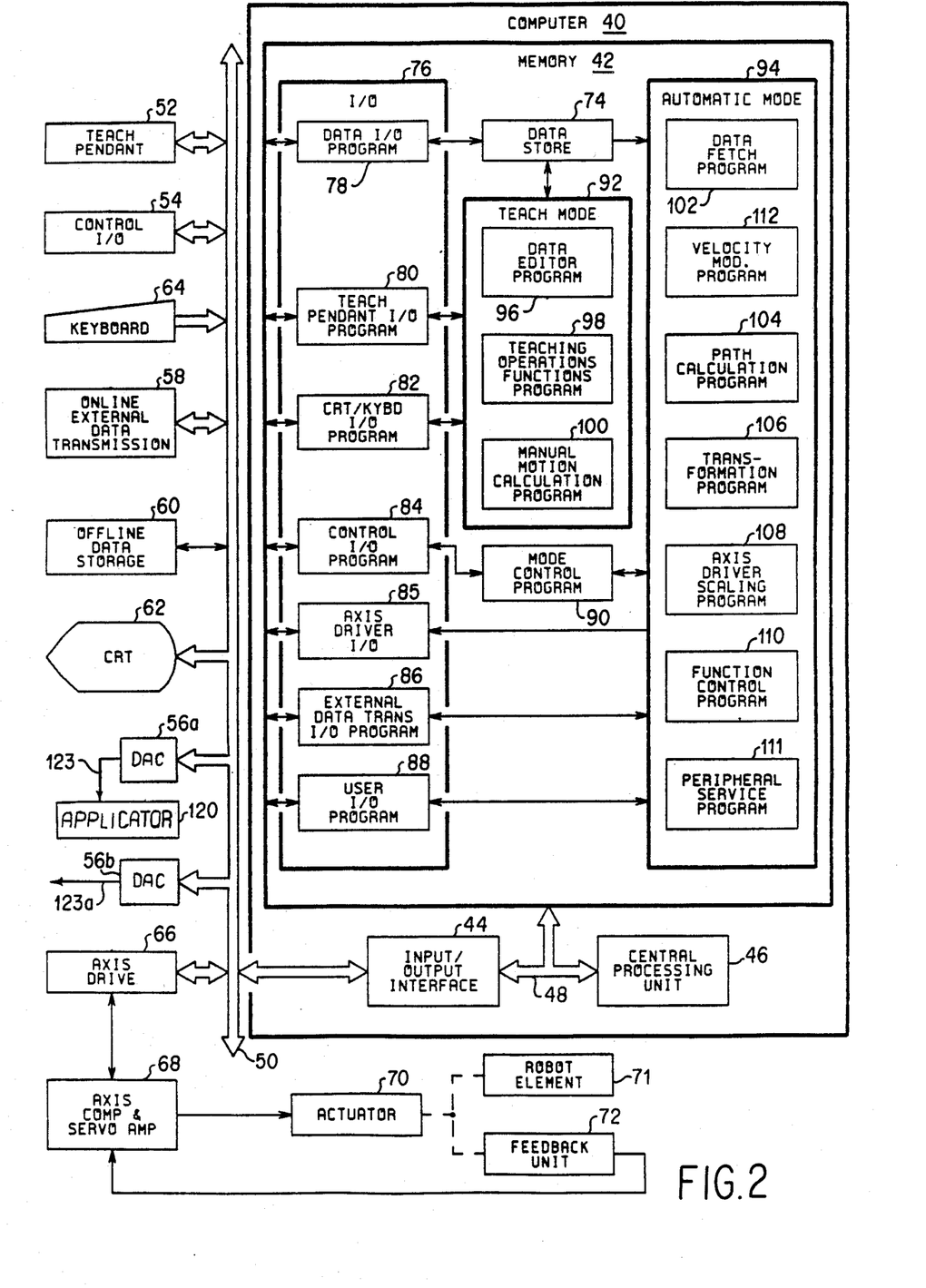
FIG. 2 is a block diagram of the control with its associated input and output interface modules.

Referring to FIG. 2, a detailed block diagram of the control is described. The control 35 includes a programmable general purpose digital computer 40 comprised of a memory 42, a central processing unit 46 and an input/output interface 44. These three elements are interconnected by bus 48. Interaction between computer 40 and the manipulator 10 and an operator are carried out by signals passed over the external bus 50 connected to a number of peripheral devices. The peripheral devices most suitable for use by an operator include the teach pendant 52 for manually producing motion commands to generate a stored program, keyboard 64 for entering information to computer memory 42, and CRT 62 for displaying data relating to the current activity of the manipulator and its stored program.

The peripheral devices used to interface the manipulator 10 to control 35 include: the control input/output interface 54, which exchanges a number of discrete device signals between the manipulator and control necessary for the operation of manipulator 10, and the axis drive interface 66 which directly controls the motion of the actuators. The axis drive 66 accepts data in digital form and executes a digital-to-analogue conversion thereby providing an analogue signal to the axis compensation and servoamplifier 68. The compensated analogue signals are then used as an input to an actuator 70 which drives the robot element 71 mechanically attached thereto. A feedback device 72, mechanically connected to actuator 70 or robot element 71, provides a feedback signal representing the actual motion of the driven element of the robot arm. Although there are several configurations for control of the servomechanism loop for each element of the robot arm, in the preferred embodiment, the axis drive 66, servoamp 68, actuator 70 and feedback element 72 are utilized in numbers equal to the number of controlled axes on the manipulator.

Also responsive to external bus 50 are a pair of digital-to-analogue converters (DAC) 56a and 56b. The DACs chosen by applicants convert 12 binary digits to a voltage ranging between −9 and +9 volts d.c. While for purposes of an exemplary showing, the present invention is described and illustrated as using two DACs, it will be understood that any number of DACs may be employed responsive to external bus 50.

In operation, the DACs receive data in digital form from bus 50 representative of a particular voltage magnitude, and convert the digital data to the corresponding analogue voltage. In the case of DAC 56a the analogue voltage is output on control line 123 to form the control drive signal for applicator gun 120. Similarly, the analogue output voltage from DAC 56b on line 123a may be used for another type of application device or function element 31. It will be understood that each of DACs 56a and 56b is independent of the other, and separately addressable and programmable as described hereinafter, so that each may be caused to produce a particular analogue voltage output at a particular point in time. Furthermore, the output voltages from the DACs may be programmed to be proportional to the velocity of the manipulator arm as will be described in more detail hereinafter.

Two further peripheral devices permit the exchange of program data. First, the on-line external data transmission interface 58 represents a device which allows data to be entered into the computer 40 from an external data store while the manipulator is executing a cycle of operation. Second, an off-line data storage interface 60 is provided for allowing program data to be input to the computer by means of such devices as a punched tape reader, a cassette reader, etc.

The memory 42 within computer 40 is comprised of two primary components. The first is the data store 74 which stores all numerical data information, and the second component defines the operating system of the manipulator. The operating system is a set of control programs directing the operation of computer 40 to effect the generation of the users program and the execution of the stored user program. For purposes of illustration, the operating system programs are shown in functionally related sets including the input/output set 76, the teach mode set 92, and the automatic mode set 94.

Included in the input/output set 76, are the data I/0 program 78, teach pendant I/0 program 80, a CRT and keyboard I/0 program 82, a control I/0 program 84, an axis driver I/0 program 85, an external data transmission program 86 and the user I/0 program 88. Each of these input/output programs correspond to a different type of peripheral being interfaced to the control and is effective to control the signal exchange between the particular peripheral device and the computer 40.

The operating system also contains a mode control program 90 for switching control of the computer between the various operating modes, for example, manual, teach, automatic, etc. Since only the automatic mode is required for the disclosed invention, only this mode will be described in detail. Within the teach mode system 92 are the data editor program 96 and a teaching operation function program 98. These two programs control the operation of the manipulator during the teach mode, and the specifics of these programs are either described in U.S. Pat. No. 3,920,972 (the disclosure of which is incorporated herein by reference) or are available from Cincinnati Milacron Inc. The automatic mode set 94 includes a data fetch program 102, a path calculation program 104, a transformation program 106, an axis driver program 108, a function control program 110, a peripheral service program 111, and a velocity modification program 112. Details of the path calculation program shall be provided herein, and details of the other programs are either specifically described in U.S. Pat. No. 3,909,600 (the details of which are incorporated herein by reference) or are available from Cincinnati Milacron Inc.

In the description which follows, reference should be made to U.S. Pat. No. 4,506,335, where elements similar to those described herein are similarly designated. In particular, FIG. 3 of the present invention corresponds to FIG. 5a of U.S. Pat. No. 4,506,335. It will be understood that the processing described in the flowcharts described herein or otherwise referenced may be implemented as firmware in a ROM embodied in memory 42.

Figure 3:
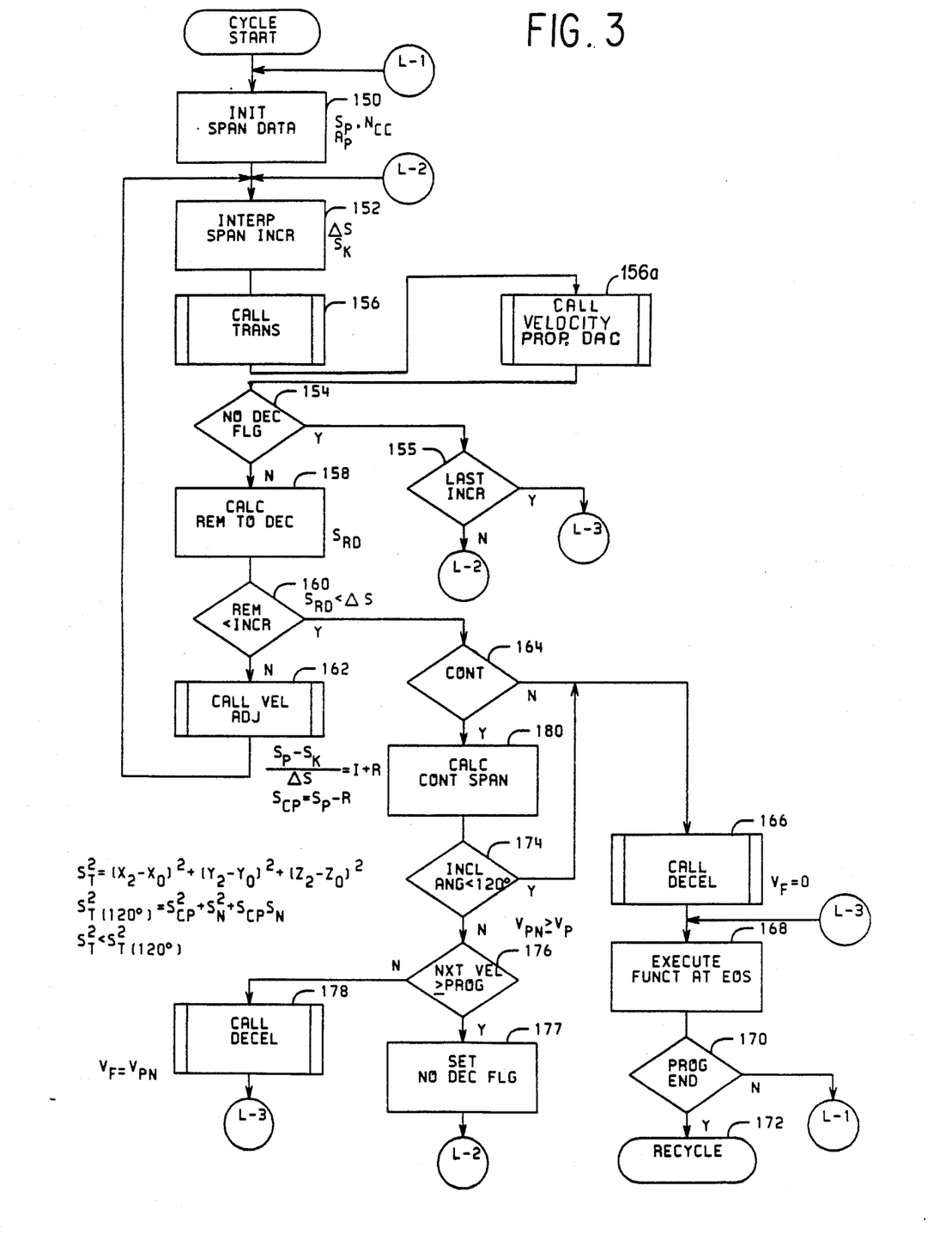
FIG. 3 is a flowchart of the principal control procedure effecting motion control.

The overall cycle of operation of manipulator 10 in the automatic mode is illustrated by the flow chart of FIG. 3. At process step 150 the control initializes the span data required to interpolate the motions between two programmed points P0 and P1 at a programmed velocity Vp. Values for the programmed span length Sp, the coordinate component ratios $N_{cc}$ and a nominal acceleration are produced by the procedure associated with step 150. At process step 152 an increment along the path is interpolated to produce an incremental distance $\Delta S$ and an accumulated incremental distance $S_K$. Process step 156 calls the subroutine to effect a transformation of the interpolated intermediate point to coordinate values specifying the angular positions of the machine actuators. These coordinates are referred to as generalized coordinates.

At this point, the processing is somewhat different from that described in U.S. Pat. 4,506,335. As shown in FIG. 3, process step 156a calls the velocity proportional DAC subroutine illustrated in FIG. 4 to produce velocity proportional output voltages from DACs 56a and 56b. Referring to this subroutine, at decision step 300, the processing tests whether the subroutine has been executed for both velocity proportional DACs 56a and 56b. If this condition has been met, the processing returns to the main program of FIG. 3. If this condition has not been met, indicating that the subroutine has been completed for neither of the DACs or only one of the DACs, the processing continues to process step 301. In process step 301, the DAC output value is calculated utilizing a particularized form of the general linear equation described hereinabove.

During the teach mode program, the specifics of which are either described in U.S. Pat. No. 3,920,972 (the disclosure of which is incorporated herein by reference) or is available from Cincinnati Milacron Inc., the operator enters for each DAC data to select the particular DAC which is to be programmed, the initial voltage VI representing the DAC output voltage Vo when the manipulator arm is at rest (velocity=0), and the final voltage VF which is the maximum DAC voltage output Vo when the manipulator arm is moving at an operator specified velocity, MAXVEL. The rate of change of DAC voltages is thus defined by the magnitude of the difference between the velocity values associated with the voltages VI and VF. The voltages VI and VF are specified in "user units" which are directly related to the voltage range of the physical DAC outputs. User units may be associated with positive or negative voltage values.

Figure 4:
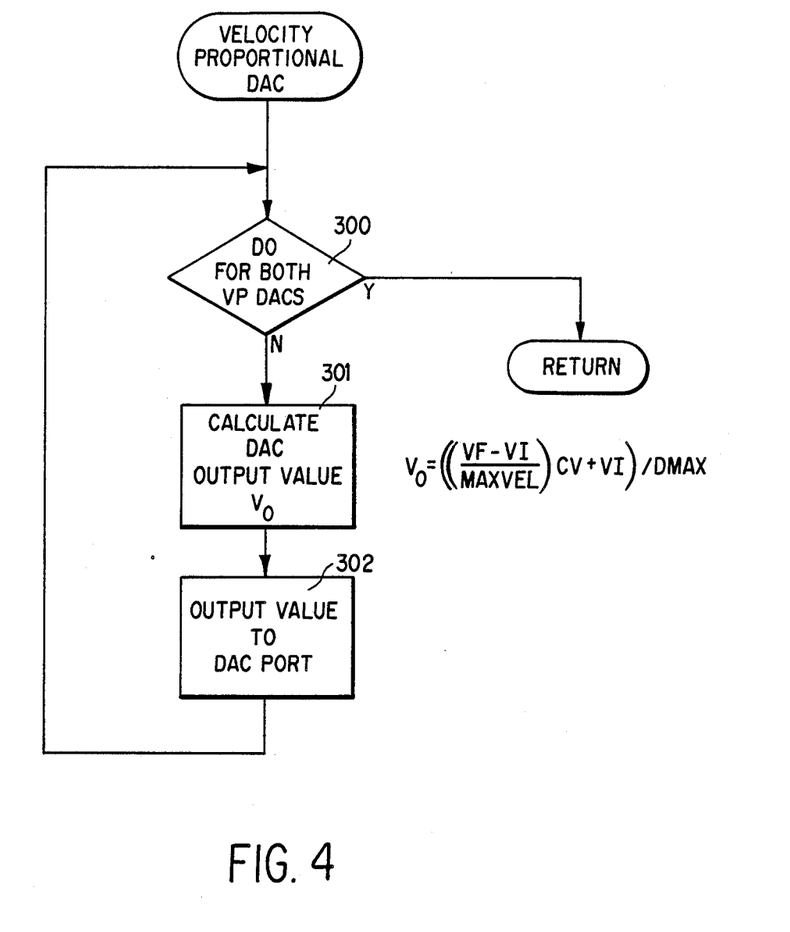
FIG. 4 is a flowchart illustrating the processing for the velocity proportional DAC control subroutine of the present invention.

Utilizing these values, as well as the instantaneous velocity CV of the workpoint the subroutine of FIG. 4 proceeds to calculate the DAC output voltage $V_o$ from the following relationship:

$$Vo = (((VF-VI)/MAXVEL)\ CV+VI)/DMAX$$

Where DMAX=Scaling for user unit of measure (user unit/volt). Thus, $$Vo=VI\ when\ CV=O\ and$$

$$Vo=VF\ when\ CV=MAXVEL$$

It will be observed that the DAC output voltage $V_0$ may either increase or decrease with velocity, depending on the choice of VF and VI. For example, if it is desired that the final DAC voltage VF be greater than the initial voltage VI, the DAC output voltage Vo will increase with tool centerpoint velocity CV. Conversely, if the initial parameters are chosen such that the initial voltage VI is greater than the final voltage VF, the DAC output voltage VO will decrease with manipulator arm velocity. In addition, the value of VI may be chosen so that when the manipulator arm is at rest, there is a residual DAC output voltage. In addition, if VI=0, the output voltage from the DAC when the manipulator arm is at rest will also be zero.

Returning to FIG. 4, the calculated DAC output voltage value Vo is sent to the appropriate DAC output port by process block 302 for utilization by the appropriate application device or function element such as adhesive applicator gun 120. When both output voltages Vo have been outputted to the respective DAC port, the processing returns to the main program of FIG. 3. The remaining processing for the system then proceeds as described in U.S. Pat. No. 4,506,335.

In addition to the iterative procedure of motion control, the automatic mode processing provides for the execution of function commands upon arrival of the workpoint at a predetermined location. Function commands are stored during program teaching in association with coordinate data defining path end points. Such function commands are used to assign particular DAC control signals to the physical DAC's 56a and 56b and to control the "on" or "off" condition of a selected DAC. In this fashion alternative functioning of a physical DAC is achieved within a single user program. A plurality of DAC parameters are specified by operator data entry and are associated with function commands which assign the parameter data to a selected physical DAC. A single physical DAC is thus made responsive to constant values changing only at predetermined locations as well as velocity proportional values varying as the workpoint traverses the predetermined path between programmed locations. To obtain constant output, neither the final voltage $V_F$ nor the limit velocity MAXVEL are input. The processing of the flowchart of FIG. 4 is then skipped and the selected DAC maintains a constant output determined by VI. A DAC operating in the velocity proportional mode may also be made to respond to varying rates of change of voltage from span to span by introducing different values for MAXVEL with function commands at predetermined locations.

It will be understood that while the foregoing implementation has been described in connection with a system having two velocity proportional DACs, that more than two velocity proportional programmable DACs may be utilized with a commensurate change to the processing. An additional step may also be included so that any one of the DACs will output the maximum DAC output voltage VF in the event the manipulator arm exceeds MAXVEL. Consequently, this limits the maximum DAC output voltage, and also permits the DAC to be used in a binary mode having two selectable voltage levels, Vo=0 and Vo=VF.

It will be observed that the DAC output voltage Vo is calculated for each incremental distance traversed by the workpoint using the type of intermediate position interpolation and incremental velocity calculation described in U.S. Pat. No. 4,506,335. Consequently, the DAC output voltage $V_0$ is substantially proportional to the instantaneous velocity of the manipulator arm, irrespective of whether the workpoint is accelerating or decelerating in a linear or non-linear fashion, or moving at constant velocity in any direction.

An example of how the DAC output voltage $V_0$ can be used in connection with the adhesive application gun 120 described hereinabove in connection with the preferred embodiment of the present invention will now be illustrated. Assume that it is desired to put down a constant width bead of adhesive along a predetermined path determined by the manipulator arm control system over a particular path length, and that the final DAC output voltage VF be greater than the initial DAC output voltage $V_I$. In this situation, the output voltage will increase with workpoint velocity, with a constant offset voltage, VI. This velocity proportional voltage can then be used to cause a flow rate of adhesive or sealant proportional to the workpoint velocity CV to be produced by applicator gun 120. Thus, under all conditions, the voltage outputs from the DACs, and hence the rate of flow from the applicator gun(s), will be proportional to the velocity of the workpoint. In all cases, the rate of change of the DAC output voltage with respect to changes in workpoint velocity can be controlled by selection of the parameter MAXVEL.

Similarly, assume that the applicator gun is to come to rest (CV=0), for example when the adhesive path changes direction. In this case, it might be desirable for VI=0, so that there is no control voltage applied to the applicator gun, and consequently no flow of adhesive.

While the invention has been illustrated in some detail according to the preferred embodiment shown in the accompanying drawings, and while the preferred embodiment has been described in some detail, there is no intention to thus limit the invention to such detail. On the contrary, it is intended to cover all modifications, alterations and equivalents falling within the spirit and scope of the appended claims. For example, while the control signals produced by the DACs have been described in detail as operating an adhesive or sealant applicator, it will be understood that other types of function elements, alone or in various combinations, may be similarly controlled including, but not limited to, paint sprayers, welding rod feeders, rotary driven tools or any other device where it is advantageous to have a control signal proportional to the velocity of the manipulator arm upon which the function element is mounted.

What is claimed is:

1. In an apparatus for effecting motion of a workpoint associated with a function element, the apparatus including a programmable manipulator including an arm having a moveable member carrying the function element, an actuator for effecting motion of the moveable member, and a control system including:
   (a) memory means for storing input signals representing information defining motion of the workpoint and operation of the function element;
   (b) a servo mechanism circuit responsive to the input signals defining motion and connected to the actuator to control motion of the moveable member; and
   (c) a digital to analogue converter responsive to the input signals defining operation of the function element for producing an analogue control signal for controlling the operation of the function element;
the improvement in combination therewith comprising:
   (a) a teaching means for storing in the memory operator entered input signals representing values for;
      (i) a final control signal magnitude (VF) assigned to a limiting velocity of the workpoint;
      (ii) an initial control signal magnitude (VI) assigned to zero velocity of the workpoint; and
      (iii) the limiting velocity (MAXVEL) of the workpoint; and
   (b) a processor means for executing the steps of:
      (i) producing a digital velocity signal (CV) representing the instantaneous velocity of the workpoint;
      (ii) producing a control signal in response to the velocity signal in accordance with the following relationship:

$$V_O = [(VF-VI)/MAXVEL]CV + VI$$

where $V_O$ is the control signal; and
      (iii) applying the control signal to the digital to analogue convertor to effect operation of the function element in proportion to the velocity of the workpoint.

2. The apparatus according to claim 1 wherein the step of producing a control signal as executed by the processor further comprises the steps of:
   (a) comparing the instantaneous velocity of the workpoint (CV) to the limiting velocity (MAXVEL); and
   (b) producing the control signal with a value equal to the value of VF in response to determining that the instantaneous velocity signal (CV) exceeds the limiting velocity (MAXVEL).

3. The apparatus according to claim 1 wherein the control system further includes a plurality of digital to analogue converters, each digital to analogue converter responsive to a control signal, and the step of producing a control signal further comprises producing an independent control signal for each digital to analogue converter in accordance with the following relationship;

$$V_{OI} = [(KF_I - KI_I)/MAXVEL_I]CV + KI_I$$

where
   I identifies a selected digital to analogue converter,
   $VO_I$ is the control signal of the With digital to analogue converter;
   $KF_I$ is the magnitude of the With control signal assigned to a limiting value of velocity;
   $KI_I$ is the magnitude of the With control signal assigned to zero velocity of the workpoint; and
   $MAXVEL_I$ is the limiting velocity associated with the With control signal.

4. The apparatus according to claim 1 wherein the step executed by the processor for producing the control signal further comprises selectively producing the control signal with a constant value and with a variable value determined by said relationship.

5. The apparatus according to claim 4 wherein no values of VF and MAXVEL are specified and the constant value is equal to the value given VI.

6. The apparatus according to claim 4 wherein further input signals representing functions for controlling the digital to analogue converter are stored and the step of producing the control signal further comprises setting the value of the control signal equal to a magnitude corresponding to a value of the analogue signal defined as the "off" condition thereof.

7. In a programmable manipulator apparatus having:
   (1) a manipulator arm including a moveable member;
   (2) an actuator associated with said arm for effecting motion of the moveable member;
   (3) an adhesive applicator carried by the moveable member and responsive to an analogue control signal for controlling the rate of flow of adhesive therefrom and having associated therewith a workpoint; and
   (4) a manipulator control system including;
      (a) a memory means for storing input signals defining motion of the workpoint and operation of the adhesive applicator;
      (b) a servo mechanism responsive to the input signals defining motion and connected to the actuator for controlling motion of the movable member; and
      (c) a digital to analogue converter responsive to the input signals defining operation of the adhesive applicator for producing an analogue control signal to control the operation of the adhesive applicator;
the improvement in said control system comprising:
   (a) a teaching means for storing in the memory operator entered input signals representing values for:
      (i) a final control signal magnitude (VF) assigned to a limiting velocity of the workpoint;
      (ii) an initial control signal magnitude (VI) assigned to zero velocity of the workpoint; and
      (iii) a limiting velocity (MAXVEL) of the workpoint; and
   (b) processing means for executing the steps of:
      (i) producing a digital velocity signal (CV) representing the instantaneous velocity of the workpoint;
      (ii) producing a control signal in response to the digital velocity signal using the relationship;

$$VO = [(VF-VI)/MAXVEL]CV + VI$$

where VO is the value of the control signal; and
      (iii) applying the control signal to the digital to analogue converter to produce a velocity proportional analogue control signal to control the rate of flow of adhesive from the applicator in response to the velocity of the workpoint.

8. The apparatus according to claim 7 wherein the step of producing a control signal as executed by the processor means further comprises the steps of:
   (a) comparing the instantaneous velocity signal CV to the limiting velocity MAXVEL; and
   (b) producing the control signal with a value equal to the value of VF in response to determining that the instantaneous velocity signal CV exceeds the limiting velocity MAXVEL.

9. The apparatus according to claim 7 wherein the step executed by the processor for producing the control signal further comprises selectively producing the control signal with a constant value and with a variable value determined by said relationship.

10. The apparatus according to claim 7 wherein further input signals representing functions for controlling the digital to analogue converter are stored in the memory and the step of producing the control signal further comprises setting the value of the control signal to a magnitude corresponding to a value of the analogue signal defined as the "off" condition thereof.

* * * * *